Patented Jan. 24, 1950

2,495,229

UNITED STATES PATENT OFFICE 2,495,229

PRODUCTION OF TETRAHYDRO-ANTHRAQUINONES

Lynn H. Dawsey, Robert R. Umhoefer, and Carl K. Muehlhausser, Kenmore, N. Y., assignors to Buffalo Electro-Chemical Company, Inc., Tonawanda, N. Y.

No Drawing. Application March 13, 1947, Serial No. 734,546

2 Claims. (Cl. 260—369)

This invention relates to an improved method for production of tetrahydroanthraquinones and their alkyl derivatives, products all of which have recently been found useful in the production of hydrogen peroxide.

Previous workers have made tetrahydroanthranol through hydrogenation of anthraquinone with noble metal and nickel catalysts at high temperatures (160°–170° C.), and high pressures (50 atmosphere) with the formation of such by-products as hexa- and octa-hydroanthraquinones. The preparation of tetrahydroanthraquinone in 70% yield has been accomplished at 75° C. and 50 atmospheres pressure, using a 20% nickel on kieselguhr catalyst. See Berichte 60, 2522 (1927). Increasing the temperature stepwise to 90° C. gave some hexahydroanthraquinone, while at 130° C. octahydroanthraquinone was formed.

The theoretical preparation of tetrahydroanthraquinone by the hydrogenation of anthraquinone involves first the addition of one mole of hydrogen to form anthrahydroquinone. This compound is then further hydrogenated to tetrahydroanthrahydroquinone, which is easily oxidized in solution by atmospheric oxygen to the tetrahydroanthraquinone. The reactions are illustrated as follows:

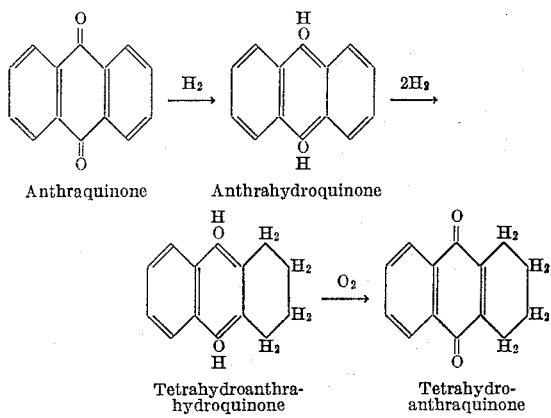

Anthraquinone    Anthrahydroquinone

Tetrahydroanthra-    Tetrahydro-
hydroquinone    anthraquinone

The present invention is concerned not with the by-products, hexa- and octa-hydroanthraquinones, but only with the production of tetrahydroanthraquinone or the corresponding alkylated derivatives. The invention, therefore, provides a means for producing the tetrahydroanthraquinones from the parent anthraquinones in substantially quantitative amounts.

An especial feature of the invention resides in its simplicity. A catalyst, together with a method of operation, has been devised whereby the hydrogenation illustrated above may be carried out without the need for high pressure equipment nor the necessity of high temperature apparatus. The reactions of the present invention are carried out at ordinary pressures of 1–3 atmospheres and at low temperatures with the formation of very pure products and with higher yields than have hitherto been possible with the high pressure technique.

The hydrogenation is effected at substantially atmospheric pressure in ordinary glass apparatus, using a porous nickel as catalyst. As the compounds involved in the above reactions are usually high melting point solids, the reduction is preferably carried out in a solvent. Although substantially any of the usual solvents may be employed, those with high solvent power for the initial and final products are preferred. Thus, di-ethylene oxide (dioxane) is the preferred solvent because it shows high solvent power for the compounds involved, and the final product can be isolated easily. However, other solvents like tetrahydronaphthalene (tetralin), decahydronaphthalene (decalin) or nonvolatile solvents, like dibutyl sebacate, have been very successfully employed in the practice of the invention.

Another novel result of the process of the present invention is that it provides conditions such that the hydrogenation essentially stops after the formation of the tetrahydroanthraquinones so that the danger of contaminating the product by overhydrogenating part of it to the higher hydrogenated anthrahydroquinones is negligible.

In order to obtain the tetrahydroanthraquinone, it is obvious that one may start with the corresponding anthrahydroquinone instead of the parent quinone itself.

The hydrogenation catalyst employed in effecting the various reductions is a very porous type of nickel called, herein, porous nickel. The porous nickel catalyst is prepared from aluminum-nickel alloys of relatively high nickel content by dissolving the aluminum in caustic soda and carefully removing the last traces of caustic soda from the porous nickel residue. This porous nickel catalyst is inert to the solvent and the products involved in the reaction.

The following examples are merely illustrative of the principles of the invention and are not limitative thereof.

*Example I.—Tetrahydroanthraquinone*

A suspension of 100 g. of anthraquinone and 10 g. of porous nickel catalyst in 500 cc. of dioxane were stirred at 65° C. in the presence of hydrogen at atmospheric pressure until 3 mole proportions of hydrogen were absorbed. The first mole of hydrogen was taken up considerably more rapidly than the next two moles. After 3 moles of hydrogen had been absorbed, the uptake of hydrogen ceased. The almost colorless, slightly fluoroescent solution was filtered and the tetrahydroanthrahydroquinone oxidized to tetrahydroanthraquinone by bubbling air through the solution until it became orange to yellow in color. The solution was heated and diluted with water to the point of cloudiness and cooled. The yellow needles of tetrahydroanthraquinone were removed by filtration and washed once with methanol. The yield was 87 g. or 85% of the theoretical; melting point, 158.5–159.5° C. Recrystallized product, melting point 159.5–160.5° C.

The absorption of hydrogen proceeds readily at atmospheric pressure with good yields. The pressure may be increased to about 3 atmospheres to speed up the reaction. The reaction is accelerated at elevated temperatures but proceeds in the range room temperature (20° C.) to 75° C.

*Example II.—2-ethyltetrahydroanthraquinone*

A solution of 100 g. of 2-ethylanthraquinone in 500 cc. of dioxane was hydrogenated as in Example I, using 15 g. porous nickel as catalyst. A yield of 85 g. or 84% of the theoretical of pure 2-ethyltetrahydroanthraquinone was obtained. Melting point, 170–171° C.

*Example III.—2-methyltetrahydroanthraquinone*

A solution of 100 g. of 2-methylanthraquinone in 500 cc. of dioxane was hydrogenated as in Example I, using 15 g. porous nickel as catalyst. 86 g. of 2-methyltetrahydroanthraquinone was obtained. Yield—84%. Melting point, 175–176° C.

What is claimed is:

1. In a process in which a solution consisting of an anthraquinone compound and an organic solvent therefor is subjected to the action of hydrogen in the presence of a hydrogenation catalyst to produce the corresponding tetrahydroanthrahydroquinone derivative, said anthraquinone compound being selected from the group consisting of anthraquinone and its 2-lower alkyl substitution products, the improvement which consists of using a porous nickel catalyst under 1 to 3 atmospheres hydrogen pressure while maintaining the temperature of the solution in the range between 20° and 75° C.

2. In a process in which a solution consisting of an anthraquinone compound and an organic solvent therefor is subjected to the action of hydrogen in the presence of a hydrogenation catalyst to produce the corresponding tetrahydroanthrahydroquinone derivative, said anthraquinone compound being selected from the group consisting of anthraquinone and its 2-lower alkyl substitution products, the improvement which consists of using a porous nickel catalyst at substantially one atmosphere hydrogen pressure while maintaining the temperature of the solution in the range between 20° C. and 75° C. until 3 mol proportions of hydrogen have been taken up.

LYNN H. DAWSEY.
ROBERT R. UMHOEFER.
CARL K. MUEHLHAUSSER.

REFERENCES CITED

The following references are of record in the file of this patent:

Skita: "Ber. deutsch Chem. Ges.," vol. 58 (1925), pp. 2685–2689, also page 2694.

Skita: "Ber. deutsch Chem. Ges.," vol. 60 (1927), pp. 2522–2527.

Dufraisse et al.: "Comptes rendus (Paris)," vol. 205 (1937) pp. 740–743.

"Chemical Abstracts," vol. 32 (1938) col. 2112 (abstract of above Dufraisse et al. article).

Delepine et al.: "Bull. Soc. Chim. France," (5th series) vol. 4. (1937) pages 31–33.